United States Patent [19]

Suemori

[11] Patent Number: 4,838,221

[45] Date of Patent: Jun. 13, 1989

[54] AUTOMOTIVE ENGINE CONSTRUCTION

[75] Inventor: Tadao Suemori, Higashihiroshima, Japan

[73] Assignee: Mazda Motor Corporation, Hiroshima, Japan

[21] Appl. No.: 145,240

[22] Filed: Jan. 19, 1988

[30] Foreign Application Priority Data

Jan. 21, 1987 [JP] Japan .................................. 62-11735
Feb. 4, 1987 [JP] Japan .................................. 62-24137

[51] Int. Cl.⁴ ......................... F02F 7/00; F16M 1/025; F16C 9/02

[52] U.S. Cl. ............................ 123/195 H; 123/192 B; 384/429; 384/432; 184/6.5

[58] Field of Search ........... 123/192 R, 192 B, 195 R, 123/195 A, 195 C, 195 H, 196 R; 184/6.5; 384/429, 430, 432

[56] References Cited

U.S. PATENT DOCUMENTS

| | | | |
|---|---|---|---|
| 4,028,963 | 6/1977 | Nakamura et al. | 74/604 |
| 4,411,227 | 10/1983 | Feichtinger | 123/195 R X |
| 4,466,401 | 8/1984 | Ogawa et al. | 123/195 R X |
| 4,467,754 | 8/1984 | Hayashi et al. | 384/429 X |
| 4,479,463 | 10/1984 | Curley et al. | 123/195 C |
| 4,497,292 | 2/1985 | Hayashi et al. | 123/195 H |
| 4,508,069 | 4/1985 | Dobler et al. | 123/192 B |
| 4,520,770 | 6/1985 | Ogawa | 384/432 X |
| 4,721,077 | 1/1988 | Fukuo et al. | 123/195 C X |

FOREIGN PATENT DOCUMENTS

| | | | |
|---|---|---|---|
| 3545722 | 1/1987 | Fed. Rep. of Germany | 384/429 |
| 0160645 | 9/1983 | Japan . | |
| 0000551 | 1/1984 | Japan . | |

*Primary Examiner*—Willis R. Wolfe
*Attorney, Agent, or Firm*—Burns, Doane, Swecker & Mathis

[57] ABSTRACT

An engine construction which comprises a cylinder block having a series of bearing seats formed therein for the support of a crankshaft, a lower block having bearing caps formed integrally therewith and adapted to be secured from below to the cylinder block with the bearing caps aligned with the corresponding bearing seats for the support of the crankshaft, a balancer shaft, a drive transmitting unit for transmitting the drive of the crankshaft to the balancer shaft, and an oil pan adapted to be removably fitted from below to the lower block and positioned on one side of the lower block opposite to the cylinder block. A surface region of the cylinder block and a mating surface region of the lower block which is brought into contact with the surface region of the cylinder block when the cylinder block and the lower block are connected together are formed with respective pluralities of bearing recesses for the support of the balancer shaft. The drive transmitting unit is operatively accommodated within an oil return space delimited by a main bearing cap, located rearmost of the lower block, and a rear end wall of the lower block that is positioned rearwardly of the main bearing cap.

13 Claims, 6 Drawing Sheets

AUTOMOTIVE ENGINE CONSTRUCTION

BACKGROUND OF THE INVENTION

1. Field of the Invention

The present invention generally relates to an automotive engine system and, more particularly, to an engine balancer used to minimize vibrations occurring in the engine system.

2. Description of the Prior Art

The use of an engine balancer in an automotive engine construction is well known. In general, one or more balancer shafts each having a balance weight are provided in an engine cylinder block and are drivingly coupled with a power output shaft of the engine so that the balancer shafts can be driven at a number of revolution per unit time which is equal to, or an integral multiple of, that of the engine power output shaft so as to produce centrifugal forces necessary to counteract first-harmonic, second-harmonic or higher-harmonic moments and/or inertia forces which have resulted from the reciprocating motion of the pistons within the engine cylinders.

When it comes to the balancer shafts, some methods of installing the balancer shafts in the engine system are well known. One method is that a generally elongated balancer chamber for each of the balancer shafts is defined in the cylinder block in parallel relationship with the crankshaft and the respective balancer shaft is operatively supported in position inside the balancer chamber with its opposite end rotatably extending outwardly through the front and rear end walls of the cylinder block, such as disclosed in, for example, the U.S. Pat. No. 4,028,963, patented June 14, 1977. Another method is that the balancer shafts are disposed inside the crankcase while suspended from the bottom of the cylinder block, such as disclosed in, for example, the Japanese Laid-open Patent Publication No. 58-160645 published Sept. 24, 1983.

According to the first-mentioned publication, the support rigidity of the balancer shafts is high and a drive mechanism for driving the balancer shafts can be employed which is similar in construction to that used for driving auxiliary equipments. However, since the balancer shafts extend completely through the engine cylinder block and lengthwise of the engine itself, and since the front ends of the balancer shafts situated outside and adjacent the front end wall of the engine cylinder block are drivingly coupled with a belt type or gear type drive mechanism, not only is the installation of the balancer shafts in the engine system complicated and time-consuming, but also the engine must have a substantial length to accommodate one or more drive belts for driving the auxiliary equipments and the drive mechanism for the balancer shafts that are arranged offset one after another in a direction lengthwise of the engine. While the drive mechanism for the balancer shafts may be either a combination of an endless belt and pulleys, a combination of an endless chain and sprocket wheels, or a train of gears, an additional problem would occur where the endless chain or the gear train is employed, for it requires a regular oiling.

According to the second-mentioned publication, a train of gears necessitated to transmit the drive of the engine power output shaft to the balancer shafts is disposed exteriorly of the rear end wall of the engine cylinder block and, therefore, any possible interference between the drive mechanism for the balancer shafts and those for the auxiliary equipments such as occurring in the method according to the first-mentioned publication can be avoided.

However, even the method of the second-mentioned publication has problems. Specifically, not only is the support rigidity of the balancer shaft low, but also the height of the engine must be increased to provide the space for accommodating the balancer shafts. Moreover, it is highly possible that vibrations induced by the rotation of the balancer shafts may be transmitted to a skirt region of the engine cylinder block and then amplified to produce offensive noises and, also, it is possible that an increased number of component parts might be required which would result in the complicated and time-consuming installation of the balancer shafts.

The U.S. Pat. No. 4,497,292, patented Feb. 5, 1985, discloses the use of a lower or skirt block which is positioned between the engine cylinder block and a bearing beam structure of one-piece construction for the support of the crankshaft. Specifically, the bearing beam structure comprises a plurality of bearing caps each corresponding in position to a mating bearing recess defined in a lower block or skirt structure that is secured from below to the engine cylinder block with the crankshaft rotatably clamped between the bearing caps and the mating bearing recesses. This bearing beam structure is effective to minimize the torsional rotation of the crankshaft to thereby minimize vibrations induced by the engine system.

The support of the balancer shaft in a motor-cycle engine at the interface between the engine cylinder block and the crankcase is disclosed in, for example, the Japanese Laid-open Patent Publication No. 59-551 published Jan. 5, 1984, although no further details are clear because this publication is directed essentially to the arrangement of cylinder banks in the motor-cycle engine. However, it appears that the servicing of the crankshaft used in the motor-cycle engine disclosed in this publication requires the removal of the crankcase and that, since various bearing recesses are defined at the interface between the engine cylinder block and the crankcase, complicated and time-consuming procedures are required to re-position the crankcase, once removed for the servicing, in such a way as to permit the bearing recesses in the engine cylinder block to be exactly aligned with the mating bearing recesses in the crankcase. This problem is considerable where the engine cylinder block is made of aluminum alloy, such as disclosed in this publication, which is so relatively soft and yieldable that, when the cylinder block and the crankcase are bolted together firmly, the roundness of some of the bearings may be adversely affected.

In any event, it is well known that, even in the V-6 engine, i.e., the engine having two rows or banks of three cylinders each which banks are set at an angle to each other so as to assume the shape of a figure of "V", second-order moments tend to be generated during the operation of the engine. However, it appears that no attempt has been made to use the balancer shafts in the V-6 engine currently aboard any commercially available automotive vehicle.

More specifically, the use of the balancer shafts has originally aimed at suppressing second-harmonic vibrations occurring in four-cylinder, in-line engines in a vertical direction, suppressing moments induced in three-cylinder engine, or suppressing both of the second-harmonic vibrations occurring in the vertical direction and the moments in the four-cylinder, in-line engines. In the case of V-6 engine, since the fundamental and second-harmonic inertia forces acting in the vertical direction are substantially counterbalanced with each other and higher harmonic inertia forces can be of a substantially negligible level, it is a general notion that no balancer shaft need be installed in the V-6 engine. In addition, although it is well recognized that in the V-6 engine the second-harmonic moments tend to occur because the cylinders in one bank are offset relative to the cylinders in the other bank with respect to the direction lengthwise of the engine, no attempt has been made to use the balancer shaft or any other balancer means for suppressing the second-harmonic moments.

However, with the advent of the age of high-performance, high-quality cars, demand has been made to minimize vibrations occurring in the automotive vehicle having the V-6 engine and the presence of second-harmonic moments can no longer be negligible.

SUMMARY OF THE INVENTION

The present invention has been devised with a view to substantially eliminating the above discussed problems and has for its essential object to provide an improved engine construction utilizing a balancer which does not result in the increase of either the length and the height of the engine without adversely affecting the rigidity of support of the balancer shaft.

Another important object of the present invention is to provide an improved engine construction of the type referred to above, which can be readily and easily assembled without substantially incurring an increase in manufacturing costs.

In order to accomplish these objects, the present invention provides an engine construction which comprises a cylinder block having a series of bearing seats formed therein for the support of a crankshaft, a lower block having bearing caps formed integrally therewith and adapted to be secured from below to the cylinder block with the bearing caps aligned with the corresponding bearing seats for the support of the crankshaft, a balancer shaft, a drive transmitting means for transmitting the drive of the crankshaft to the balancer shaft, and an oil pan adapted to be removably fitted from below to the lower block and positioned on one side of the lower block opposite to the cylinder block.

A surface region of the cylinder block and a mating surface region of the lower block which is brought into contact with the surface region of the cylinder block when the cylinder block and the lower block are connected together are formed with respective pluralities of bearing recesses for the support of the balancer shaft. The drive transmitting means is operatively accommodated within an oil return space delimited by a main bearing cap, located rearmost of the lower block, and a rear end wall of the lower block that is positioned rearwardly of the main bearing cap.

According to the present invention, the combination of the feature, in which the balancer shaft is supported between the cylinder block and the lower block, with the feature in which not only are the bearing caps integrally formed with the lower block for the support of the crankshaft in cooperation with the corresponding bearing seats in the cylinder block, but also the bearing recesses for the support of the balancer shaft in cooperation with the bearing recesses in the cylinder block are formed in respective bulkheads integral with the lower block, contributes to the increase in support rigidity of the bearing caps, rigidity of both of the cylinder block and the lower block, and support rigidity of the balancer shaft.

Moreover, the installation of the drive transmission means within the oil return space delimited between the rearmost main journal and the end wall of the cylinder block is effective to minimize the possibility of increase of the overall length of the engine and also to facilitate oiling of the drive transmission means. In addition, the lower block has its bottom formed with an opening that is closed by the oil pan when the latter is fitted to the lower block. Therefore, when the oil pan is removed from the lower block, the opening at the bottom of the lower block provides an access to the crankshaft notwithstanding the presence of the balancer shaft thereby to facilitate the servicing of the crankshaft.

While it is a general notion that the V-6 engine does not require the use of the balancer shaft, the use of the lower block of specific construction and of the balancer shaft combined with the structural design that has resulted in the increase in rigidity makes it possible to further minimize the vibrations induced in the V-6 engine during the operation of such engine, and, therefore, the present invention is effective to provide the V-6 engine which is very quiet and which ensures comfortable riding.

Also, the disposition of the balancer shaft in a space generally beneath one of the cylinder banks is effective to provide a freedom of engine layout without adversely affecting the requirements of compactness.

When it comes to the power plant as a whole comprising the engine and a transmission, it is generally well known that the bending rigidity is low at the joint between the engine and the transmission and, therefore, vibrations tend to be induced at such joint. However, according to the present invention wherein the balancer shaft support which has a high rigidity reinforces the rigidity of a rear portion of the engine to which a clutch housing continued to the transmission housing is coupled and, therefore, vibrations which would occur in the power plant as a whole can also be minimized.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE EMBODIMENT

Referring to the accompanying drawings and, particularly, to FIGS. 1 to 12, a cylinder block of an automotive combustion engine is generally identified by 1 and is made of aluminum alloy by the use of a die casting technique. This cylinder block 1 has an upper portion thereof formed with a plurality of cylinders 3 for accommodating therein respective reciprocating pistons and also has a cavity defined in a lower portion thereof in communication with all of the cylinders 3, the opening of which cavity is oriented downwardly of the engine and is delimited by a peripheral joint surface.

Figure 12:
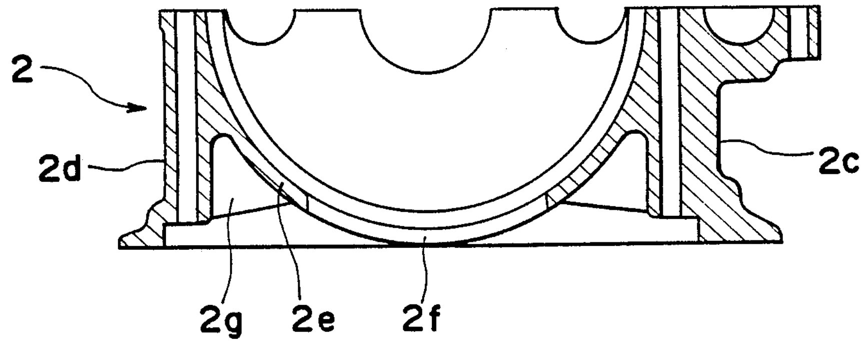
FIG. 12 is a cross-sectional view taken along the line XII—XII in FIG. 3.

Bolted from below to the cylinder block 1 is a generally rectangular lower block 2 made of aluminum alloy by the use of a die casting technique and made up of front and rear walls **2*a* and 2*b* and a pair of opposite side walls 2*c* and 2*d*. This lower block 2 has a top opening delimited by the cylinder block walls 2*a* to 2*d* and, also, a bottom opening identified by 2*f* in FIG. 12 and defined in a bottom wall 2*e* which is so curved outwardly as to avoid any possible interference with the crankshaft 8. The bottom wall 2*e* is reinforced by a plurality of ribs 2*g* which connect the bottom wall 2*e* with the adjacent side walls 2*c* and 2*d* as best shown in FIG. 12. It is to be noted that the lower block 2 also has its interior communicated with the cavity in the cylinder block 1 through the top opening. With the cylinder block 1 and the lower block 2 connected together, a crankshaft chamber 4 for accommodating a crankshaft 8 is defined by a lower region of the cavity of the cylinder block 1 and an upper region of the interior of the lower block 2**.

Figure 3:
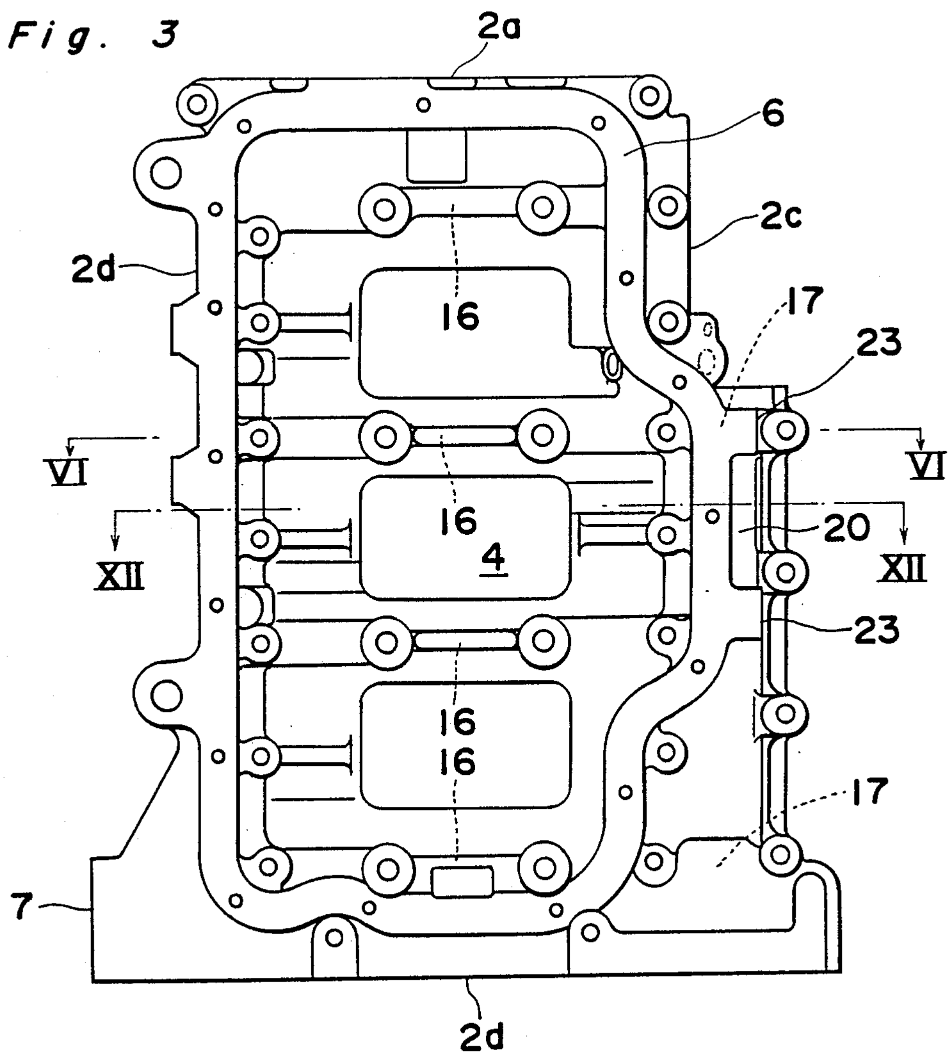
FIG. 3 is a bottom plan view of a lower block used in the engine.

An oil pan 5 is removably bolted from below to the lower block 2, the interior of which is communicated with the crankshaft chamber 4 through the bottom opening **2*f* in the bottom wall 2*e*. More specifically, as best shown in FIG. 3, respective bottom portions of the lower block walls 2*a* to 2*d* positioned on one side of the lower block 2 remote from the cylinder block 1 form a continuous flanged joint face 6 of generally rectangular configuration, to which a similarly configured flange 5*a* of the oil pan 5** is bolted with any suitable gasket interposed therebetween.

The cylinder block 1 and the lower block 2 have coupling walls formed therewith so as to protrude from a rear end wall of the cylinder block 1, identified by **1*b*, and the rear end wall 2*b* of the lower block 2, respectively, in a direction rearwardly of the engine. These coupling walls altogether form a generally semicircular-sectioned coupling flange 7** through which the engine is coupled to a clutch housing integral with, or forming a part of, a transmission housing.

Figure 4:
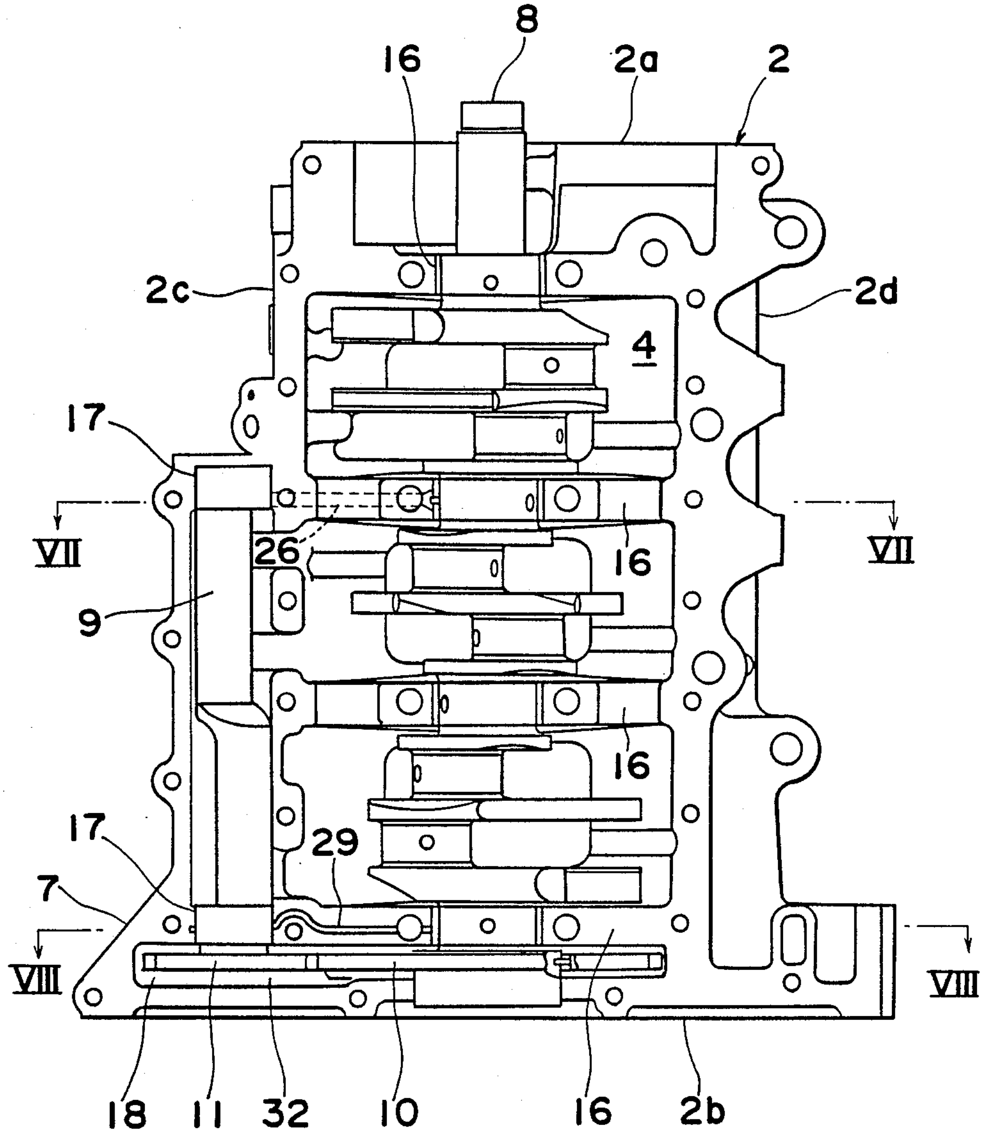
FIG. 4 is a top plan view of the lower block.

Both of the crankshaft 8 and a balancer shaft 9 having a balance weight are rotatably supported between the cylinder block 1 and the lower block 2 in a manner which will become clear later. As best shown in FIG. 4, a rear end of the crankshaft 8 has a drive gear 10 rigidly mounted thereon for rotation together therewith, which gear 10 is meshed with a driven gear 11 rigidly mounted on a rear end of the balancer shaft 9. The drive and driven gears 10 and 11 are of respective types so selected as to permit the balancer shaft 9 to be driven at a predetermined speed, which is, for example, twice the speed of rotation of the crankshaft 8, so that the balance weight of the balancer shaft 9 can produce a centrifugal force which counteracts the moments induced by the reciprocating motion of the pistons within the associated cylinders 3.

Figure 5:
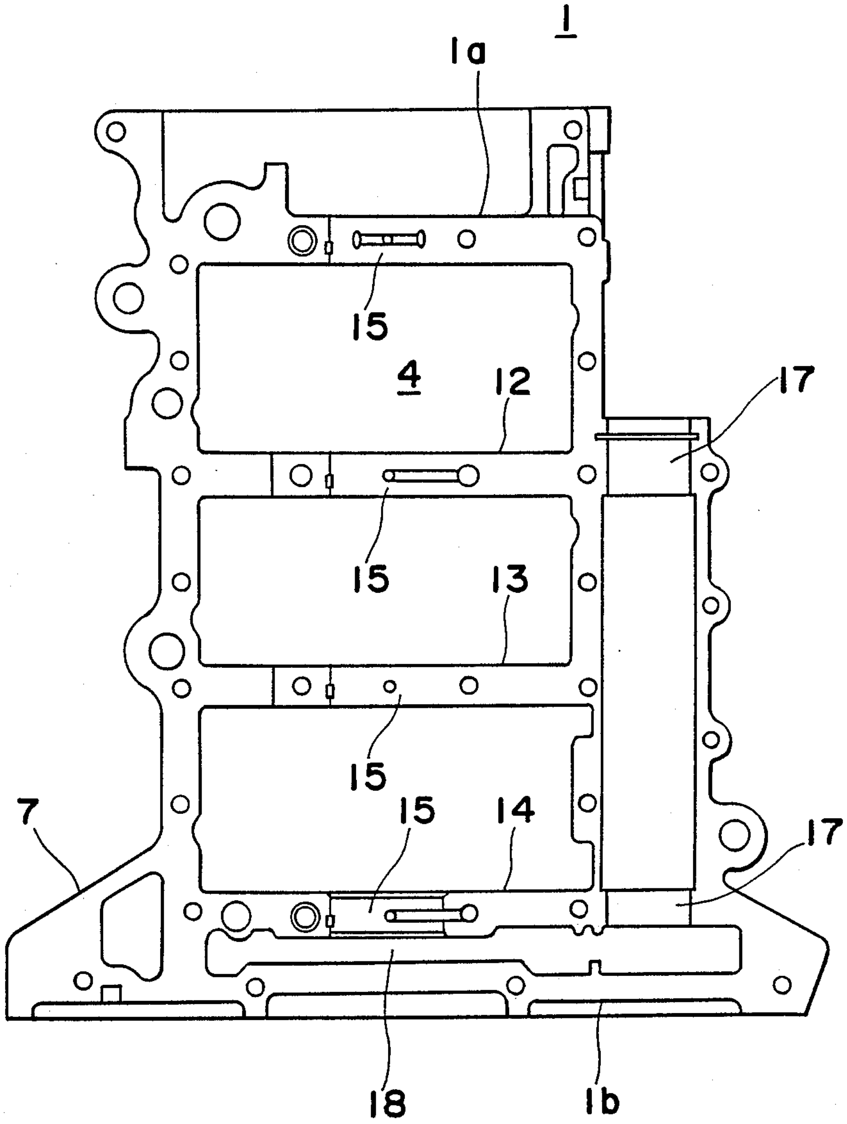
FIG. 5 is a bottom plan view of a cylinder block of the engine.

As best shown in FIG. 5 the cylinder block 1 is integrally formed with a plurality of, for example, two, intermediate partition walls 12 and 13 so as to extend widthwise of the engine, dividing the crankshaft chamber 4 into three compartments each for the paired cylinders in the respective banks, and is also integrally formed with a partition wall 14 so as to extend widthwise of the engine, which partition wall 14 is positioned inwardly of the rear end wall **1*b*. Respective lower edges of the partition walls 12 to 14 and the front end wall la of the cylinder block 1 are formed with generally semicircular main bearing recesses 15 positioned adjacent and confronting the bottom opening of the cylinder block 1. On the other hand, the lower block 2 is integrally formed with main bearing caps 16 equal in number to the number of the main bearing recesses 15 in the cylinder block 1, which caps 16 are so positioned inside the lower block 2 as to align with the associated main bearing recesses 15**.

When the cylinder block 1 and the lower block 2 are connected together, the main bearing recesses 15 in the cylinder block 1 and the associated main bearing caps 16 in the lower block 2 cooperate with each other to form respective bearing holes through which the crankshaft 8 extends rotatably with its journal portions situated inside such bearing holes. The main bearing caps 16 do not only support the crankshaft 8 in cooperation with the main bearing recesses 15, but also reinforce the lower block 2 with increased rigidity because of one-piece construction in which they are integrally formed with the lower block 2.

The cylinder block 1 is also formed with a pair of balancer shaft bearings spaced apart from each other in a direction lengthwise of the engine and positioned laterally outside one of the opposite side walls of the cylinder block 1, which bearings are respectively aligned with two of the main bearing caps 16 which support a substantially intermediate journal portion and a rear end journal portion of the crankshaft 8. On the other hand, the lower block 2 is similarly formed with a pair of balancer shaft bearings spaced from each other a distance equal to the distance between the balancer shaft bearings in the cylinder block 1 and positioned laterally outside the left-hand side wall **2*c* in alignment with the balancer shaft bearings in the cylinder block 1. The balancer shaft bearings in the cylinder block 1 and the balancer shaft bearings in the lower block 2 altogether form respective bearing holes 17 for the support of the balancer shaft 9 when the cylinder block 1 and the lower block 2** are connected together.

Thus, it has now become clear that the crankshaft 8 and the balancer shaft 9 are supported at the interface between the cylinder block 1 and the lower block 2 while one of the journal portions of the crankshaft 8 that is inwardly adjacent the drive gear 10 is situated inside the bearing hole adjacent the partition wall 14 of the lower block 2 and a journal portion of the balancer shaft 9 adjacent the driven gear 11 is situated inside the associated bearing hole 17 defined in part in the rear wall 14 of the lower block 2. In an assembled condition with the lower block 2 secured to the cylinder block 1, an oil return space 18 is defined between a combination of the partition wall 14 of the cylinder block 1 and one of the main bearing caps 16 that is closest to the rear end wall of the lower block 2 and a combination of the rear end wall 1*b* of the cylinder block 1 and the rear end wall 2*b* of the lower block for the recovery of lubricant oil used to oil valves and their associated drive system in the cylinder head. It is this oil return space 18 in which the drive and driven gears 10 and 11 for transmitting the drive of the crankshaft 8 to the balancer shaft 9 are operatively accommodated and meshed with each other.

Figure 6:
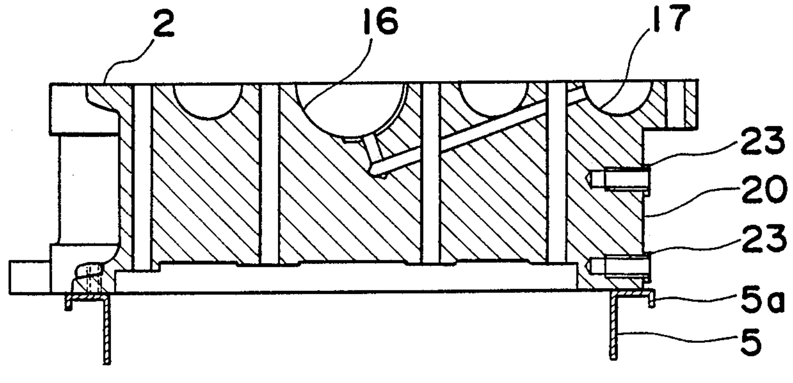
FIG. 6 is a cross-sectional view taken along the line VI—VI in FIG. 3.

As best shown in FIGS. 3 and 6, that substantially intermediate portion of the left-hand side wall 2*c* of the lower block 2 including a corresponding portion of the flanged joint face 6, which is located immediately below the balancer shaft 9, is laterally outwardly bulged to provide a bulged wall area identified by 20. The left-hand side wall 2*c* of the lower block is, as best shown in FIG. 1, formed with a pair of spaced apart vertical walls 21 connected at an upper end to the foremost balancer shaft bearing and at the opposite, lower end to a front portion of the bulged wall area 20, through which vertical walls 21 the foremost balancer shaft bearing is firmly connected to the bulged wall area 20.

This left-hand side wall 2*c* of the lower block 2 is also formed with a transverse wall member 22 for connecting together the rearmost balancer shaft bearing and the coupling wall integral with the cylinder block 1 and forming a part of the coupling flange 7. This wall member 22 has one end connected with the rearmost balancer shaft bearing and the opposite end connected with the coupling wall that is integral with the cylinder block and forming a part of the coupling flange 7.

Figure 1:
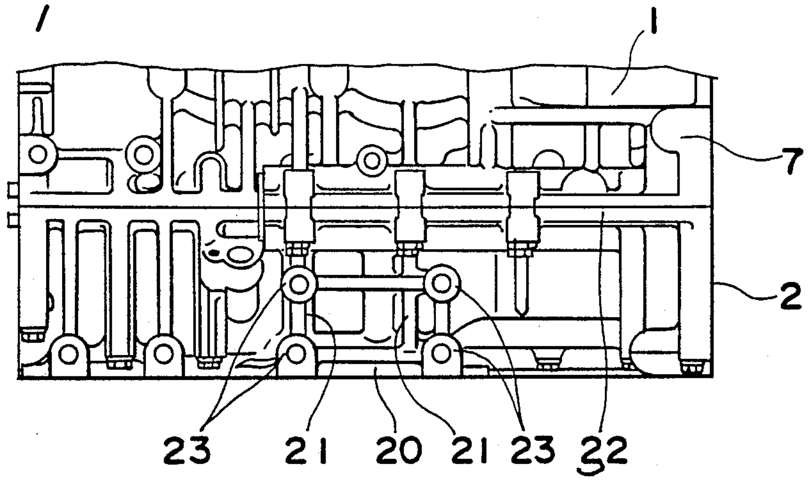
FIG. 1 is a fragmentary side view of an automotive internal combustion engine.
Figure 2:
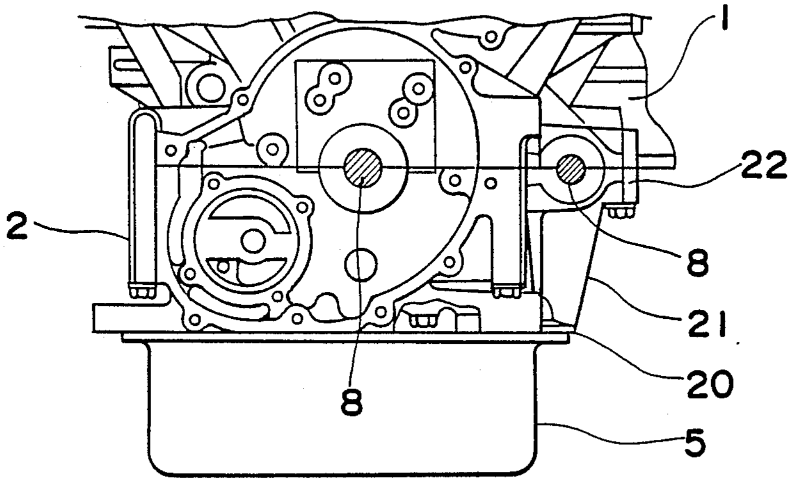
FIG. 2 is a fragmentary front elevational view of the engine.

As best shown in FIGS. 1, 3 and 6, that portion of the left-hand side wall 2*c* of the lower block 2 which protrudes laterally outwardly to define the bulged wall area 20 is formed with two pairs of mounting bosses 23 extending inwardly thereof in a direction generally perpendicular to the side wall 2*c*, each pair of said mounting bosses 23 being so positioned as to align with one of the two main bearing caps 16 which support the corresponding intermediate journal portions of the crankshaft 8. These mounting bosses 23 are adapted to receive respective fastening members, for example, bolts, used to mount the engine on an automotive chassis or an automotive body structure.

Figure 7:
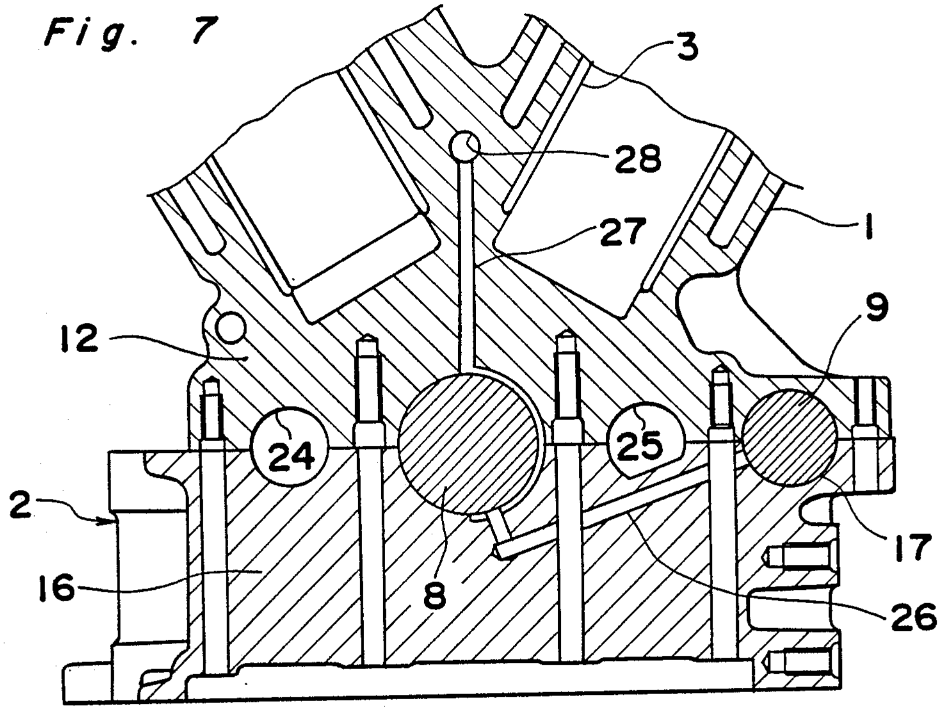
FIG. 7 is a cross-sectional view, on an enlarged scale, taken along the line VII—VII in FIG. 4.

The neighboring compartments of the crankshaft chamber 4 located on respective sides of the foremost partition wall 12 are communicated with each other through generally circular-sectioned balance holes 24 and 25 defined on respective sides of the crankshaft 8, as shown in FIG. 7, for the purpose of enabling one of such compartments to accommodate change in pressure in the other of such compartments Each of these balance holes 24 and 25 is delimited by a respective generally semicircular recess, defined in the foremost partition wall 12 in the cylinder block 1, in cooperation with a respective generally semicircular recess defined in one of the main bearing caps 16 in the lower block 2 which is associated with such foremost partition wall 12.

Referring to FIGS. 4 and 7, the main bearing cap 16 has an oil passage 26 defined therein, said oil passage 26 being communicateable at one end with the associated bearing hole for the support of the crankshaft 8 and at the opposite end with the associated bearing hole 17 for the support of the balancer shaft 9. This bearing hole for the support of the crankshaft 8 is adapted to receive lubricant oil supplied from a main gallery 28, defined in the cylinder block 1, through an oil supply passage 27, the oil in the bearing hole for the support of the crankshaft 8 being in turn supplied to the associated balancer shaft bearing hole 17 through the oil passage 26 for lubricating the balancer shaft 9.

Figure 8:
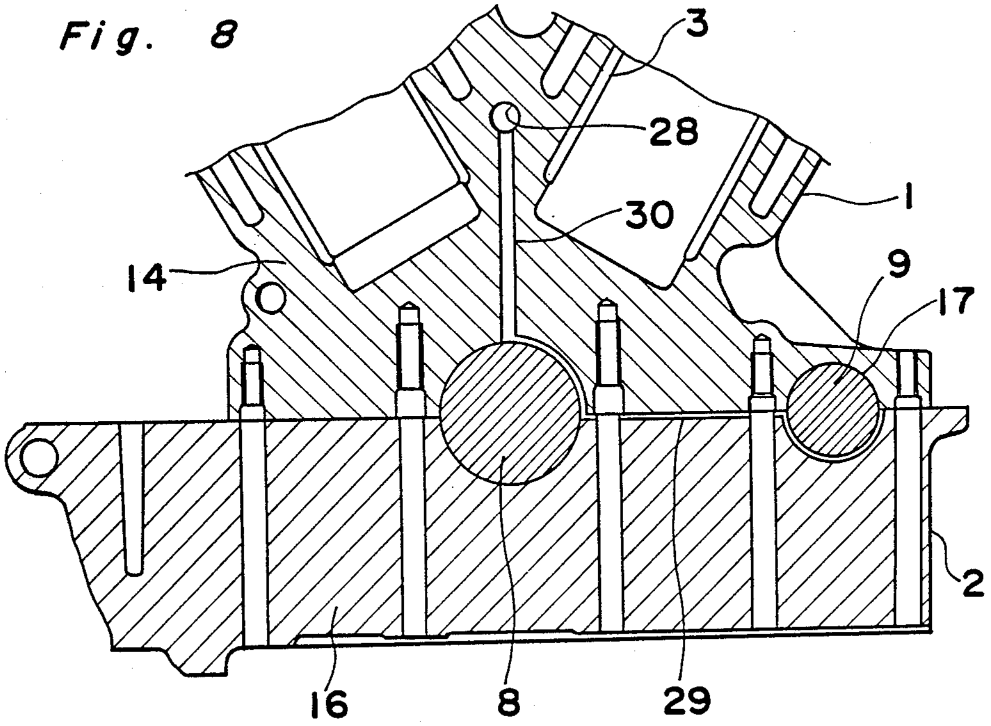
FIG. 8 is a cross-sectional view, on an enlarged scale, taken along the line VIII—VIII in FIG. 4.

Likewise, as best shown in FIGS. 4 and 8, a lower surface of the rearmost partition wall 14 in the cylinder block 1 and an upper mating surface of the main bearing cap 16 which corresponds in position to the rearmost partition wall 14 are formed with respective grooves which, when the cylinder block 1 and the lower block 2 are connected together, define an oil passage 29 communicating the bearing hole for the support of the crankshaft 8 and the associated bearing hole 17 for the support of the balancer shaft 9 together. The bearing hole for the support of the crankshaft 8 is adapted to receive lubricant oil supplied from the main gallery 28 through an oil passage 30, the oil in the bearing hole for the support of the crankshaft 8 being in turn supplied to the associated balancer shaft bearing hole 17 through the oil passage 29 for lubricating the balancer shaft 9.

Figure 9:
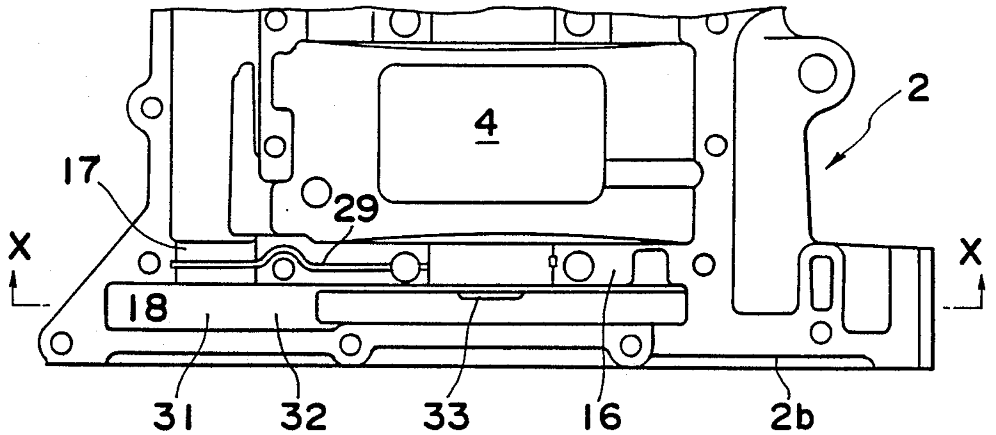
FIG. 9 is a fragmentary top plan view showing a portion of the lower block of FIG. 4 on an enlarged scale.
Figure 10:
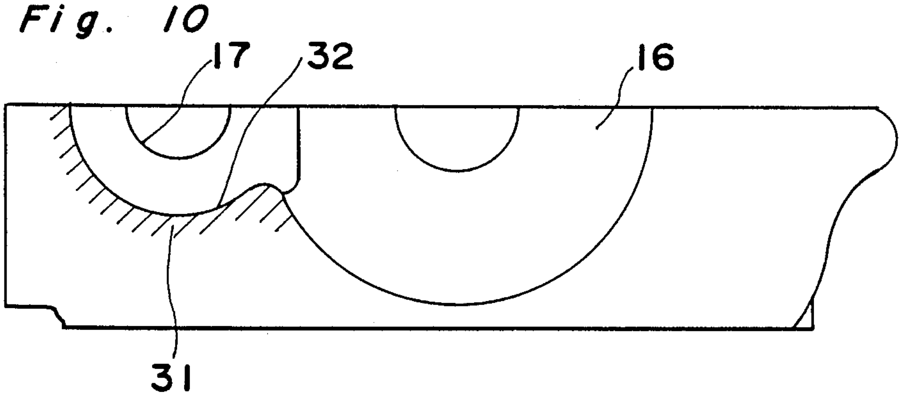
FIG. 10 is a cross-sectional view taken along the line X—X in FIG. 9.

Referring now to FIGS. 9 and 10, the lower block 2 is integrally formed with a generally arcuate transverse wall 31 so curved as to follow the curvature of the driven gear 11 on the balancer shaft 9 and as to connect the rear end wall 2*b* of the lower block 2 and the rearmost main bearing cap 16 together, said arcuate transverse wall 31 being positioned between the rear end wall 2*b* of the lower block 2 and the rearmost main bearing cap 16 and generally beneath the driven gear 11. An upper face of this arcuate transverse wall 31 is so inwardly recessed in a generally arcuate shape so as to define a reservoir 32 for collecting an end flow oil drained from the bearing holes and also the oil returned from the cylinder head.

Figure 11:
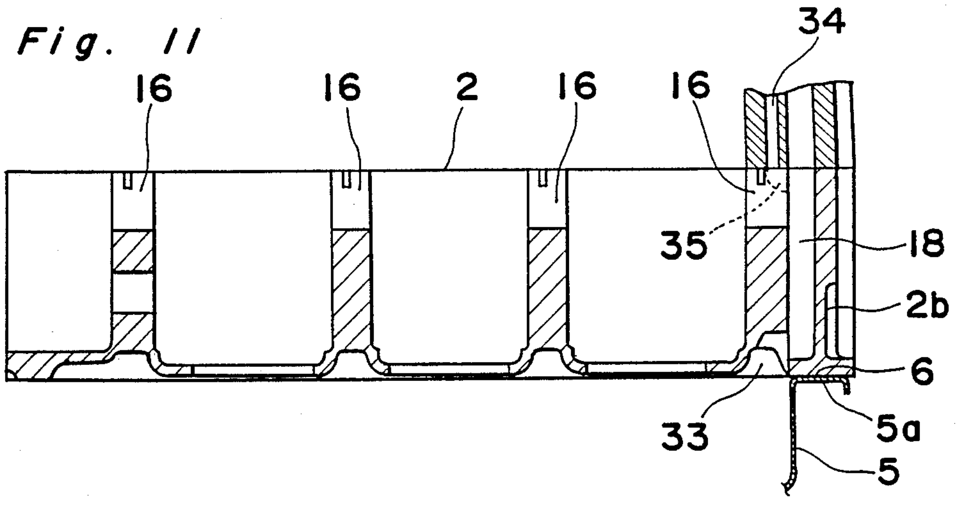
FIG. 11 is a fragmentary longitudinal sectional view of the lower block.

As best shown in FIGS. 3 and 11, an offset passage 33 is defined in the lower block 2 at a location inwardly offset relative to the oil return space 18 and generally below a substantially intermediate portion of the rearmost main bearing cap 16. This offset passage 33 is communicated at one end with the oil return space 18 and at the other end opening at a lower face of the rearmost main bearing cap 16 so that the oil within the oil return space 18 can be returned back to the oil pan 5.

Furthermore, as best shown in FIGS. 9 and 11, the lower block 2 is also formed with a connecting passage 35 formed in an upper face of a portion of the rearmost main bearing cap 16 adjacent the side wall 2*b*, which passage 35 is positioned at a location inwardly offset relative to the oil return space 18. This connecting passage 35 communicates the oil return space 18 with a blow-by gas passage 34 defined in the cylinder block 1 so that blow-by gases in the crankshaft chamber 4 can be guided into the blow-by gas passage 34 through the oil return space 18 and, then through the connecting passage 35, which are in turn supplied into a fuel induction passage.

As hereinbefore described, since the drive and driven gears 10 and 11 rigidly mounted on the crankshaft 8 and the balancer shaft 9, respectively, are disposed within the oil return space 18 that is defined between the rearmost main bearing cap 16 and the rear end wall 2*b* of the lower block 2, any possible increase of the length of the engine as a whole can be avoided. The disposition of the balancer shaft 9 at the interface between the cylinder block 1 and the lower block 2 can facilitate not only the assembly of the engine as a whole, particularly the installation of the balancer shaft 9 during the fitting of the lower block 2 to the cylinder block, but also the servicing of the crankshaft and other associated components regardless of the presence of the oil pan 5 secured to the lower block 2.

Also, since a portion of the flanged joint face 6 corresponding in position to the left-hand side wall 2*c* is defined on the bulged wall portion 20, the rigidity of the bulged wall portion 20 can be increased. Moreover, since the foremost bearing for the balancer shaft 9 is connected with the bulged wall portion 20 of high rigidity through the vertical wall 21, the support rigidity of such foremost bearing for the balancer shaft 9 can be increased.

The connection of the rearmost bearing for the balancer shaft 9 with a portion of the coupling flange 7 integral or fast with the lower block 2 through the transverse wall 22 allow the support rigidity of the rearmost bearing for the balancer shaft 9 to be increased.

Furthermore, since the mounting bosses 23 are formed in the bulged wall portion 20 of high rigidity and are continued to the main bearing caps 16, the mounting bosses 23 can have an increased rigidity which in turn contributes to the increase in rigidity of engine mounting.

The increase in support rigidity of both of the balancer shaft 9 and the engine mounting can be accomplished merely by the formation of the bulged wall portion in the side wall of the lower block 2 and the subsequent formation of the bearing recesses forming parts of the bearing holes 17 for the balancer shaft 9 and, also, the formation of the mounting bosses 23 at respective intersections between the main bearing caps 16 and the bulged wall portion, and, therefore, any possible increase in weight of the engine resulting from the use of the lower block 2 can be minimized.

Again, since the balance holes 24 and 25 are formed in the partition wall 12 frontwardly of the cylinder block 1, any possible variation in pressure within the crankshaft chamber 4 can be lessened. In addition, the formation of the oil passage 26 and the oil grooves 27 for the supply of lubricant oil to the bearing holes 17 for the balancer shaft 9 are formed in the main bearing caps 16 in the lower block 2, that portions of the balancer shaft 9 which are rotatably accommodated within the respective bearing holes 17 can be oiled at all times during the operation of the engine. In such case, the balance holes 24 and 25 can readily be formed by forming associated recesses in mating faces of the partition wall 12 frontwardly of the cylinder block 1 and the lower block 2, and the oil grooves 29 can readily be formed by grooving mating faces of the partition wall 14 rearwardly of the cylinder block and the lower block 2.

Yet, the formation of the reservoir 32 at a position beneath the driven gear 11 permits the end flow oil from the bearing holes 17 for the balancer shaft 9 and the oil returned from the cylinder head to be used for lubricating the driven gear 11 and to be transferred from the driven gear 11 onto the drive gear 10 to lubricate the latter. In such case, no passage for the flow of the oil is needed to be defined in the partition walls 14 and, therefore, the cylinder block 1 can be manufactured compact. Furthermore, the transverse wall 31 formed at a location below the driven gear 11 is effective to prevent the oil from being scattered from the driven gear 11, thereby to minimize the amount of oil mists contained in the blow-by gases.

The presence of the transverse wall 31 assists to increase the rigidity of the rear end wall 2*b* of the lower block 2 and the rearmost main bearing cap 16 and, therefore, the rigidity of support of the clutch housing by the cylinder block 1 and the lower block 2 can be increased.

According to the present invention, since the offset passage 33 is defined offset inwardly of the lower block 2 relative to the oil return space 18, a wall portion between the offset passage 33 and the oil return space 18 is effective to minimize any possible entry of oil scattered from the crankshaft chamber 4 and oil mists contained in the blow-by gases into the oil return space 18, thereby avoiding any possible reverse flow of the oil.

Since the offset passage 33 is defined in the main bearing cap 16 inwardly of the lower block 2, a lower face of the rear end wall 2*b* of the lower block 2 need not be disposed so as to protrude outwardly from the engine and, therefore, the formation of the offset passage 33 does not bring about any increase in length of the engine as a whole. Yet, the use of the lower block 2 and the cylinder block 1 which are members separate from each other and the formation of the oil return space 18, the offset passage 33 and the connecting passage 35 in the lower block 2 make it possible to facilitate the manufacture and machining of the separate blocks 1 and 2.

Furthermore, the lower block 2 has the curved bottom wall 2*e* in addition to the side walls 2*c* and 2*d*, which bottom wall 2*e* contributes to the increase in rigidity against bending and twisting and also to the increase in rigidity of the engine in a direction frontwardly and rearwardly of the main bearing caps 16. Moreover, since the balancer shaft 9 is installed at a rear portion of the engine adjacent the clutch housing, the rigidity at the joint between the engine as a whole and the transmission housing which has hitherto considered having a relatively small bending strength can be increased enough to withstand the bending force and also to minimize the vibrations which would be induced by the bending.

Although the present invention has been fully described in connection with the preferred embodiment thereof with reference to the accompanying drawings, it is to be noted that various changes and modifications are apparent to those skilled in the art. By way of example, the main bearing caps need not be integrally formed with the lower block.

Such changes and modifications are to be understood as included within the scope of the present invention as defined by the appended claims unless they depart therefrom.

Claim:

1. An engine construction which comprises:

a cylinder block having two banks of three cylinders each set at an angle to each other so as to assume the shape of a figure of "V" and also having front and rear end walls and a pair of side walls, said cylinder block further having a skirt region opening downwards, said skirt region having a plurality of partition walls each extending between the side walls of the cylinder block and also a series of bearing seats defined in the partition walls for the support of a crankshaft;

a lower block having front and rear end walls and a pair of side walls and bolted from below to the skirt region of the cylinder block with the front, rear and side walls of said cylinder block continued respectively to the front, rear and side walls of the lower block, said lower block also having bearing caps formed integrally therewith so as to traverse between the side walls of the lower block, said bearing caps, when the lower block is bolted to the cylinder block, forming respective bearing holes for the support of the crankshaft in cooperation with the associated bearing a balancer shaft drivingly geared to the crankshaft so as to be rotated at a speed twice the speed of rotation of the crankshaft;

a balancer shaft bearing means and a balancer shaft chamber both defined at the joint between the cylinder block and the lower block for the support of the balancer shaft so as to extend generally parallel to the crankshaft;

said lower block having an oil return passage communicated with cylinder head, said oil return passage being defined between one of the bearing holes closest to the rear end wall of any one of the cylinder and lower blocks and the rear end wall of any one of the cylinder and lower blocks;

a drive gear mounted on the crankshaft for rotation together therewith, and a driven gear meshed with the drive gear and mounted on the balancer shaft for rotation together therewith, both of said drive and driven gears being accommodated within a space delimited by the front and rear end of the cylinder and lower blocks, the bearing seats and the bearing caps;

said balancer shaft bearing means including a rear bearing, defined in one of a wall member continued to one of the partition walls in which one of the bearing caps closest to the rear end wall of the cylinder block is formed, and a front bearing defined in another wall member continued to one of the partition walls in which one of the bearing caps intermediate of all of the bearing caps is formed;

said lower block having a fitting flange formed with the rear end thereof so as to protrude outwardly for connection with a clutch housing; and an oil pan removably fitted from below to the lower block and positioned on one side of the lower block opposite to the cylinder block.

2. An engine construction which comprises:

a cylinder block having front and rear end walls and a pair of side walls, said cylinder block further having a skirt region opening downwards, said skirt region having a plurality of partition walls each extending between the side walls of the cylinder block and also a series of bearing seats defined in the partition walls for the support of a crankshaft;

a lower block having front and rear end walls and a pair of side walls and bolted from below to the skirt region of the cylinder block with the front, rear and side walls of said cylinder block continued respectively to the front, rear and side walls of the lower block, said lower block also having bearing caps formed integrally therewith so as to traverse between the side walls of the lower block, said bearing caps, when the lower block is bolted to the cylinder block, forming respective bearing holes for the support of the crankshaft in cooperation with the associated bearings;

a balancer shaft supported so as to extend generally parallel to the crankshaft and drivingly geared to the crankshaft so as to be rotated at a speed twice the speed of rotation of the crankshaft;

a balancer shaft bearing means and a balancer shaft chamber both defined at the joint between the cylinder block and the lower block for the support of the balancer shaft so as to extend generally parallel to the crankshaft;

an end wall means having a first space for guiding an end flow oil from the bearing means to a crankcase, said first space being defined between the cylinder block and one of the bearing holes adjacent one of the front and rear end walls of the lower block;

a drive gear mounted on the crankshaft for rotation together therewith, and a driven gear meshed with the drive gear and mounted on the balancer shaft for rotation together therewith, both of said drive and driven gears being accommodated within said first space;

an oil reservoir defined generally beneath the gears within the first space;

said lower block having a fitting flange formed with the rear end thereof so as to protrude outwardly for connection with a clutch housing; and an oil pan removably fitted from below to the lower block and positioned on one side of the lower block opposite to the cylinder block.

3. An engine construction which comprises:

a cylinder block having front and rear end walls and a pair of side walls, said cylinder block opening downwards having a plurality of partition walls each extending between the side walls of the cylinder block and also a series of journals defined in the partition walls for the support of a crankshaft, said cylinder block also having a first space defined therein for guiding an end flow oil from the journals to a crankcase;

a lower block having front and rear end walls and a pair of side walls and bolted from below to the skirt region of the cylinder block with the front, rear and side walls of said cylinder block continued respectively to the front, rear and side walls of the lower block, said lower block also having bearing caps formed integrally therewith so as to traverse between the side walls of the lower block, said bearing caps, when the lower block is bolted to the cylinder block, forming respective bearing holes for the support of the crankshaft in cooperation with the associated bearings;

a balancer shaft supported so as to extend generally parallel to the crankshaft and drivingly geared to the crankshaft so as to be rotated at a speed twice the speed of rotation of the crankshaft;

a balancer shaft bearing means and a balancer shaft chamber both defined at the joint between the cylinder block and the lower block for the support of the balancer shaft so as to extend generally parallel to the crankshaft;

a drive gear mounted on the crankshaft for rotation together therewith, and a driven gear meshed with the drive gear and mounted on the balancer shaft for rotation together therewith, both of said drive and driven gears being accommodated within said first space;

an oil reservoir defined generally beneath the gears within the first space;

said lower block having a fitting flange formed with the rear end thereof so as to protrude outwardly for connection with a clutch housing; and an oil pan removably fitted from below to the lower block and positioned on one side of the lower block opposite to the cylinder block.

4. An engine construction which comprises:

a cylinder block having front and rear end walls and a pair of side walls and also having a series of bearing seats formed therein for the support of a crankshaft;

a lower block having front and rear end walls and a pair of side walls and also having a bearing caps formed integrally therewith and adapted to be secured from below to the cylinder block with the bearing caps aligned with the corresponding bearing seats for the support of the crankshaft;

a balancer shaft;

a drive transmitting means for transmitting the drive of a crankshaft to the balancer shaft, said drive transmitting means being accommodated within an oil recovery space which is defined between one of the bearing caps closest to the rear end wall of the lower block and the rear end wall of the lower block;

mating joint faces of at least one partition wall in the cylinder block and of a mating partition wall forming the bearing caps in the lower block being formed with cutouts which form respective balance holes each communication between spaces on respective sides of the partition wall; and an oil pan adapted to be removably fitted from below to the lower block and positioned on one side of the lower block opposite to the cylinder block.

5. The engine construction as claimed in claim 4, wherein one of the partition walls in the lower block which is formed with a bearing seat for the support of a front end of the balancer shaft and in which the corresponding bearing cap having the balance holes defined therein is formed is formed with an oil passage forming a balancer shaft bearing and a bearing cap bearing so as to detour the balance holes, said oil passage being communicated with an oil gallery in a cylinder head through the bearings for the support of the crank shaft.

6. The engine construction as claimed in claim 5, wherein at least one of the mating joint faces of that partition wall in the cylinder block and of the mating partition wall forming the bearing caps in the lower block are formed with respective grooves which form an oil passage communicating between the bearing holes for the support of the crankshaft and the bearing holes for the support of the balancer shaft, said oil passage being communicated with the oil gallery in the cylinder block through the bearing holes for the support of the crankshaft.

7. An engine construction which comprises:

a cylinder block having front and rear end walls and a pair of side walls and also having a series of bearing seats formed therein for the support of a crankshaft;

a lower block having a front and rear end walls and a pair of side walls and also having bearing caps formed integrally therewith and adapted to be secured from below to the cylinder block to define a joint with the bearing caps aligned with the corresponding bearing seats for the support of the crankshaft, the rear end wall of the lower block being formed with a flange section that is adapted to be connected to a clutch housing:

a balancer shaft having a balance weight laterally offset relative to the axis of rotation of the balancer shaft;

balancer shaft bearing means defined at the joint between the cylinder block and the lower block for supporting the balancer shaft;

a drive transmitting means for transmitting the drive of a crankshaft to the balancer shaft, said drive transmitting means being accommodated within a oil recovery space which is defined between one of the bearing caps closest to the rear end wall of the lower block and the rear end wall of the lower block; and an oil pan adapted to be removably fitted from below to the lower block and positioned on one side of the lower block opposite to the cylinder block.

8. The engine construction as claimed in claim 7, wherein the engine construction is a V-6 engine and wherein said balance weight is formed on the balancer shaft on a respective side with respect to the axis about which the balancer shaft rotates, said balancer shaft being adapted to be driven at a speed twice the speed of rotation of the crankshaft.

9. The engine construction as claimed in claim 7, wherein an oil return passage is defined between the rearmost bearing seat in the cylinder block and the rear end wall of the cylinder block, and a portion generally beneath a driven gear forming a part of the drive transmitting means disposed within a space between the rearmost bearing cap in the lower block and the rear end wall of the lower block is closed to define an oil reservoir, and wherein an passage communicated with a crankcase is defined beneath a crankshaft drive gear chamber communicated with the oil reservoir.

10. The engine construction as claimed in claim 7, wherein the rear end wall of the lower block is formed with a flange section adapted to be connected with a clutch housing, said rear end wall of the lower block partitioning a space on the side of the crankcase from the clutch housing.

11. The engine construction as claimed in claim 7, wherein the side walls of the lower block connect the bearing caps together while extending in a direction lengthwise of the engine construction, and said lower block also has a curved wall formed so as to protrude downwards following the curvature of the imaginary circle in which the crankshaft rotates and also to connect the bearing caps at a location downwardly thereof, and an oil drain opening defined in the curved wall.

12. The engine construction as claimed in claim 11, wherein the side walls of the lower block connect the bearing caps together while extending in a direction lengthwise of the engine construction and form parts of an outer peripheral wall of a crankcase, a rear portion of one of the side walls of the lower block being bulged outwardly to define a balancer shaft chamber which open upwardly through a joint face of the cylinder block, that peripheral joint face at the bottom of the lower block which corresponds in position to the rear portion of such one of the side walls of the lower block being correspondingly budged outwardly.

13. The engine construction as claimed in claim 12 wherein the lower block is formed with a plurality of reinforcement ribs which connect between a lower portion of a balancer shaft chamber and a joint face of the lower block with which the oil pan is connected.

* * * * *